Figure 1:
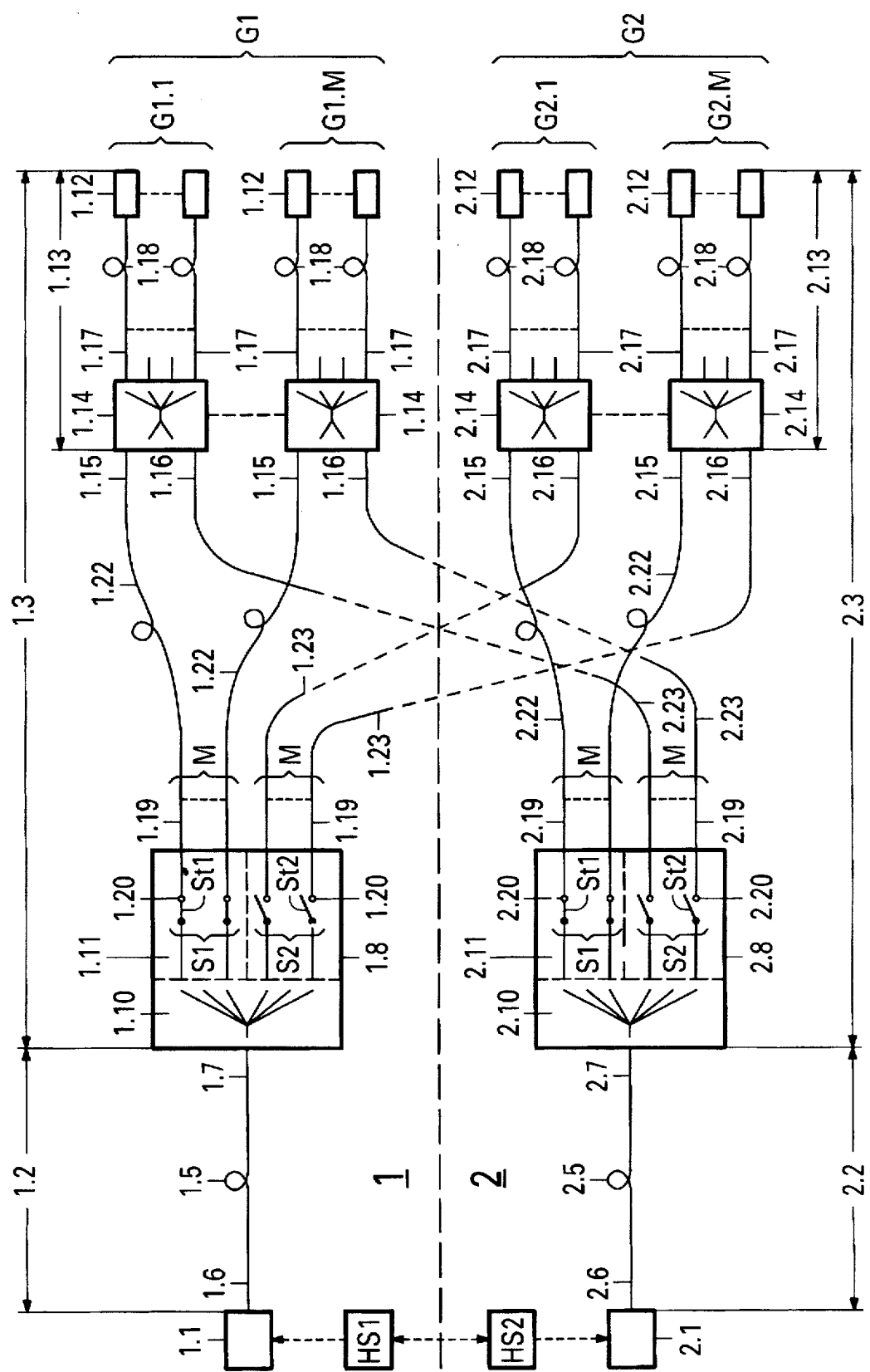

United States Patent [19]
Van Deventer et al.

[11] Patent Number: 5,896,474
[45] Date of Patent: Apr. 20, 1999

[54] OPTICAL NETWORK HAVING PROTECTION CONFIGURATION

[75] Inventors: Mattijs Oskar Van Deventer, Leidschendam; Johannes Jacobus Gerardus Maria Van Der Tol, Zoetermeer, both of Netherlands

[73] Assignee: Koninklijke KPN N.V., Groningen, Netherlands

[21] Appl. No.: 08/840,547

[22] Filed: Apr. 2, 1997

[30] Foreign Application Priority Data

Apr. 24, 1996 [NL] Netherlands .................. 1002940

[51] Int. Cl.$^6$ ............................................. H04L 1/22
[52] U.S. Cl. ..................................... 385/24; 370/216
[58] Field of Search .................... 370/216–217, 370/220; 359/161, 110, 117, 118, 120, 121; 385/24

[56] References Cited

U.S. PATENT DOCUMENTS

| | | | |
|---|---|---|---|
| 5,317,439 | 5/1994 | Fatehi et al. | 359/110 |
| 5,365,368 | 11/1994 | Hsu et al. | |
| 5,408,462 | 4/1995 | Opoczynski. | |
| 5,524,154 | 6/1996 | Bergland et al. | 385/17 |
| 5,539,564 | 7/1996 | Kumozaki et al. | 359/131 |
| 5,740,157 | 4/1998 | Demiray et al. | 370/219 |

FOREIGN PATENT DOCUMENTS

| | | |
|---|---|---|
| 43 06 032 A1 | 9/1994 | Germany. |
| WO 95/10146 | 4/1995 | WIPO. |

OTHER PUBLICATIONS

T. Wu; "A Novel Architecture for Optical Dual Homing Survival Fiber Networks"; 1990; pp. 309.3.1–309.3.6; IEEE Conf. No Month.

M. Gerla et al; "Fault Tolerant PON Topologies"; Jan., 1992; pp. 0049–0056; IEEE Infocom '92.

I. Van de Voorde et al; "The Evolution of Optical Access Networks Towards Large Split . . . "; pp. 9.1-1–9.1-10; Sep., 1995; 7th IEEE Workshop on Optical Access Networks.

M. Janson et al; "Monolithically Integrated 2×2 InGaAsP/InP Laser Amplifier Gate Switch Arrays"; Apr. 9, 1992; pp. 776–778; Electronics Letters vol. 28, No. 8.

T. Wu; "Fiber Network Service Survivability"; No Month 1992; pp. 8–15; 82–85; 100–109; Artech House Boston/London.

V. Bhagavath et al; Novel Self–Healing Fiber–in–the–Loop Architectures; TUE1 OFC'92 Technical Digest.

Primary Examiner—Rodney Bovernick
Assistant Examiner—Ellen E. Kang
Attorney, Agent, or Firm—Frishauf, Holtz, Goodman, Langer & Chick

[57] ABSTRACT

A passive optical-connection network having a protection configuration consists of at least two subnetworks (1, 2), each comprising an access node (1.1, 2.1), a feed network (1.2, 2.2), and a tree-shapedly branched access network (1.3, 2.3). According to this protection configuration there is coupled an end (1.7, 2.7) of a feed network (1, 2), both over a first set (s1) of switches by way of operational connections (1.22 and 2.22) to access ports (1.14 and 2.14) of the access network of the own subnetwork, and over a second set (s2) of switches by way of protection connections (1.23 and 2.23) to corresponding access ports (2.14 and 1.14) of the access network of another subnetwork. The advantage is that corresponding parts of neighbouring similar subnetworks may be used multiply in failure situations without duplicating costly network parts.

11 Claims, 3 Drawing Sheets

OPTICAL NETWORK HAVING PROTECTION CONFIGURATION

A. BACKGROUND OF THE INVENTION

1. Field of the invention

The invention lies in the field of protection systems for networks, such as passive optical networks. More in particular, it relates to a passive optical network having a protection configuration for applying a protection principle based on multiple accessibility, such as the principle of dual homing.

2. Prior art

Developments are increasingly going in a direction of applying passive optical networks (PONs) to the access network, with optical-fibre connections being pulled through to near the subscriber (FTTC [fibre to the curb] or FTTH [fibre to the home]). Configurations for such an access network based on a PON for providing narrow- and wideband communication between a main station and a large number of linked-up subscribers are known per se, such as, e.g., from reference [1] (see below under C. for more details with respect to the references). Said known network comprises a tree-shaped branching of optical connections, hereinafter called access network, which is provided with a large number (up to approx. 2000) of branchings (or splittings-up) at the subscriber connection side, and a trunk-shaped open feeder, hereinafter called feed network, to an access node of the optical network, where a main station is located. In the access network, the splitting up is effected in two stages, i.e., a first stage (1:16) directly at the connection to the feed network and a second stage (1:128) nearer the subscriber connections. The lengths of the optical connections in the access network are relatively short (<10 km). The length of the feed network may rather vary (0–100 km), depending on the position of the main station. To be capable, at the subscriber connection side, of detecting signals of sufficient strength, signal amplification is required in view of the high degree of splitting-up in the access network, and depending on the length of, in particular, the feed network. Therefore, in the known configuration there are included, at two locations in the optical connections, optical signal amplifiers, namely, a feeder repeater halfway through the feed network and a splitter repeater in the coupling of the feed network to the access network. Such an optical network is vulnerable, however, when optical connections fail, namely, all the more vulnerable in the event of a larger number of connections and a longer feed network. Particularly a fibre or cable breakage in the feed network will have serious consequences. To minimize the consequences of failure of connections in the feed network as a result of cable breakage or equipment failure, the entire network might be duplicated. This is very costly, however, and not strictly necessary. In fact, as a cable breakage or equipment failure in the network occurs at a location closer to the subscriber side, where the access network is further split up, the size of the consequences will decrease. The known technique makes use thereof by applying a protection configuration in which the feed network and the first stage of the access network are duplicated, and the accepted principle of dual homing (see, e.g., reference [2]) is applied, with the redundant feed network leading to a second access node, which offers a second main station access to the network or also offers the same main station a second access to the network. An optical network having such a protection configuration, however, proportionally is still costly, especially in geographical situations in which the probability of failure occurring in the duplicated part of the network, and the redundant part of the network being actually used, is slight.

In reference [3] there are disclosed self-healing architectures for "fiber-in-the-loop" (FITL) networks having a relatively small number of connections. In a first version, every connection in a distribution area is also accessible from a main station by way of a protection fibre connection which runs through an adjacent distribution area. In a second version, an operational fibre connection in a distribution area is also used as a protection fibre connection for an adjacent distribution area, with a WDM [wavelength division multiplex] technique having a separate wavelength, being applied to the protection signal transport. Said known self-healing architectures are not or hardly suitable for tree-shapedly branched optical networks having large numbers of network connections.

Reference [4] describes a protection switching system which comprises pairs of (electrical) telecommunication modules for processing or switching telecommunication signals. Each pair comprises an operational module and a standby module. The system further comprises monitoring and switching means for switching over to the standby module upon failure of the corresponding operational module with, as long as the standby module is standby, the latter monitoring the operation of the operational module. The pairs of telecommunication modules may be connected to one another by means of optical-fibre connections. If, according to such a protection technique, an optical network, such as the PON described above, is provided with a protection configuration with, e.g., the feed network and the first stage of the access network forming the duplicated modules, for said optical network there also apply the drawbacks already referred to.

B. SUMMARY OF THE INVENTION

The object of the invention is to supply a passive optical-connection network provided with a protection configuration for applying a protection principle based on multiple accessibility, such as the principle of dual homing, which does not have the above drawback of the known technique. This is achieved by applying a specific protection coupling between two or more neighbouring similar optical networks which each comprise a feed network and an access network (whether phased or not). Here, the protection coupling is such that corresponding parts, such as the feed network and possibly also a first stage of the access network of a neighbouring similar optical network, may be used multiply in failure situations.

For this purpose, an optical-connection network having a protection configuration for applying a protection principle based on dual accessibility, such as the dual-homing principle, comprising:

- a first and a second access node,
- a first group of optical network connections,
- a first passive tree-shapedly branched access network of optical connections between an access port of the access network and the first group of optical network connections,
- a first feed network provided with a first end coupled to the first access node, and with a second end coupled to the optical access port of the first access network, and
- a second feed network provided with a first end coupled to the second access node, and with a second end coupled to the optical access port of the first access network, with the first feed network providing for a first operational connection to the optical access port of the first access network, and the second feed network providing for a first protection connection to the optical access port of the access network for use upon failure of the first operational connection, and which network is of a type as disclosed in reference [1], wherein according to the invention the optical-connection network further comprises:

first protection switching means for switching over the first operational connection to the first protection connection upon failure of the first operational connection, a second group of optical network connections, and a second passive tree-shapedly branched access network of optical connections between an access port of the second access network and the second group of optical network connections, and wherein the second end of the second feed network is also coupled to the access port of the second access network, with the second feed network providing for a second operational connection for the second access network. If the operational connection by way of one of the feed networks actually fails, and is actually switched over by the protection switching means to the protection connection by way of the other feed network, such admittedly involves a loss of capacity per network connection, since in this case both groups of network connections must be served by way of one and the same feed network (in the event of groups with the same numbers of connections, the loss is 50%). Still, all connections continue to be operable, while a duplication of costly network parts may be omitted. Moreover, as long as the protection connection is in use from the main station, which is connected to the access node of the protection connection at a higher network level, the signal transport may be controlled on the basis of priority. Such a control, however, is not part of the present invention.

The protection principle of the invention is more generally applicable as well. For this purpose, an optical-connection network having a protection configuration for applying a protection principle based on multiple accessibility, such as the dual-homing principle, comprising a number ($N \geq 2$) of access nodes, a corresponding number of groups of optical network connections, and a corresponding number of separate subnetworks, with a j-th subnetwork (for each $j=1, \ldots, N$) comprising:

a passive tree-shapedly branched access network of optical connections between an optical access port of the access network and a j-th group of optical network connections, and a feed network provided with a first end coupled to the j-th access node and with a second end coupled to the optical access port of the access network, which feed network provides for an operational connection of the j-th access node to the optical access port of the access network, wherein the second end of the feed network of a j-th subnetwork is at the same time coupled to an optical access port of the access network of a k-th subnetwork ($k \neq j$), with the feed network of the j-th subnetwork providing for a protection connection for the k-th subnetwork for use upon failure of the operational connection of the k-th subnetwork, and wherein the j-th subnetwork further comprises protection switching means for switching over upon failure of the operational connection of the k-th subnetwork to the protection connection by way of the feed network of the j-th subnetwork.

Further embodiments of the optical-connection networks according to the invention are summarised in the subclaims.

C. REFERENCES

[1] L. Van de Voorde and G. Van der Plas, "The evolution of optical access networks towards large split, wide range passive optical networks", 7th IEEE Workshop on optical access networks, 24–28 Sept. 1995, pp. 9.1–1/10;

[2] T.-H. Wu, "Fiber Network Service Survivability", Artech House, Boston/London, 1992, section 3.2 "Dual-Homing Architectures", pp. 83–85, and section 3.5 "Optical Dual-Homing Architectures", pp. 100–108;

[3] V. K. Bhagavath et al., "Novel self-healing fiber-in-the-loop architectures", OFC '94 Technical Digest, paper TuEl, pp. 16–18;

[4] U.S. Pat. No. 5,408,462;

[5] U.S. Pat. No. 5,365,368;

[6] M. Janson, et al., "Monolithically integrated 2×2 InGaAsP/InP laser amplifier gate switch arrays", Electron. Lett., Apr. 9th, 1992, Vol. 28, No. 8, pp. 776–778.

The references referred to above are considered incorporated in the present application.

D. BRIEF DESCRIPTION OF THE DRAWING

Figure 2:
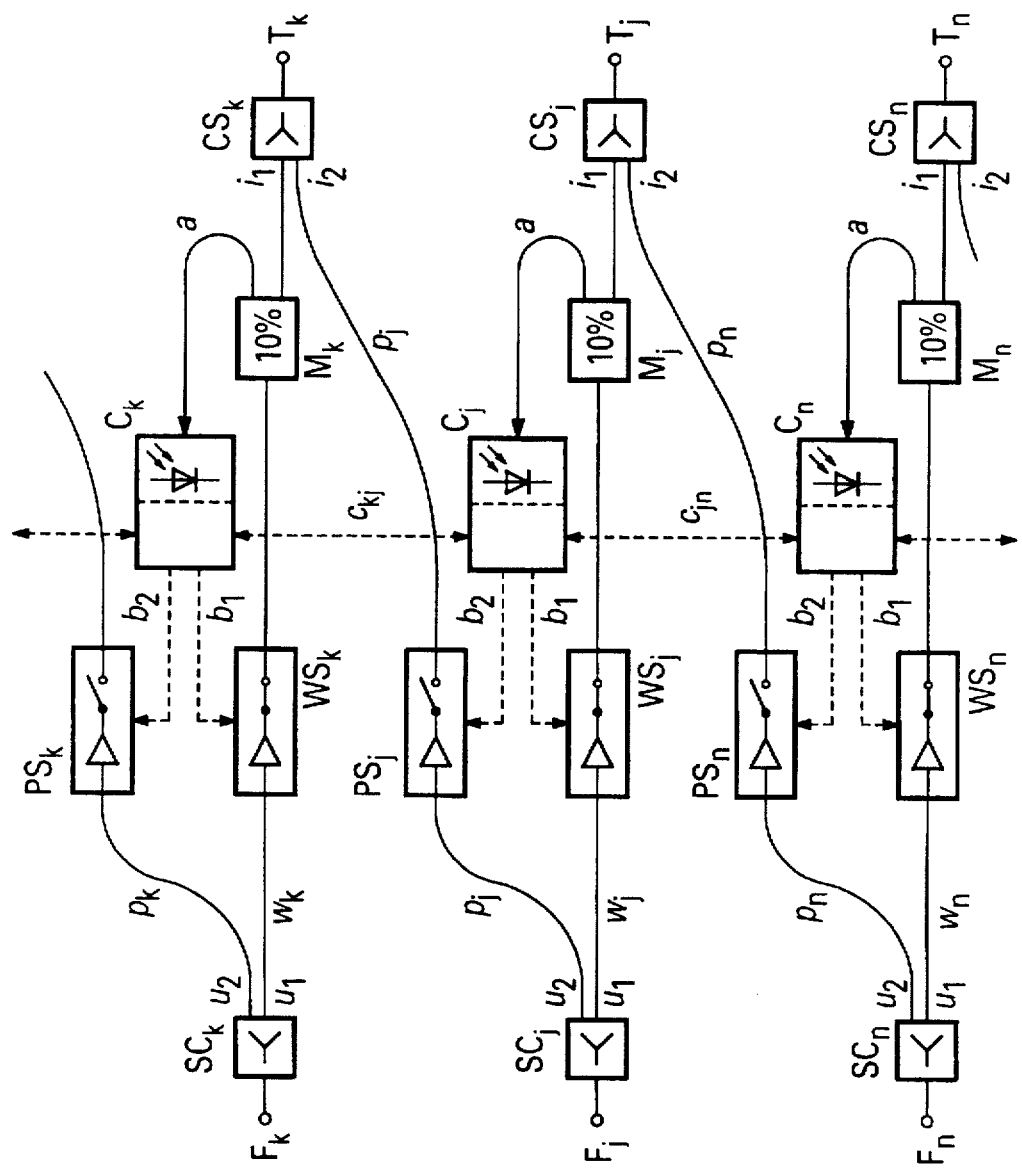
Figure 3:
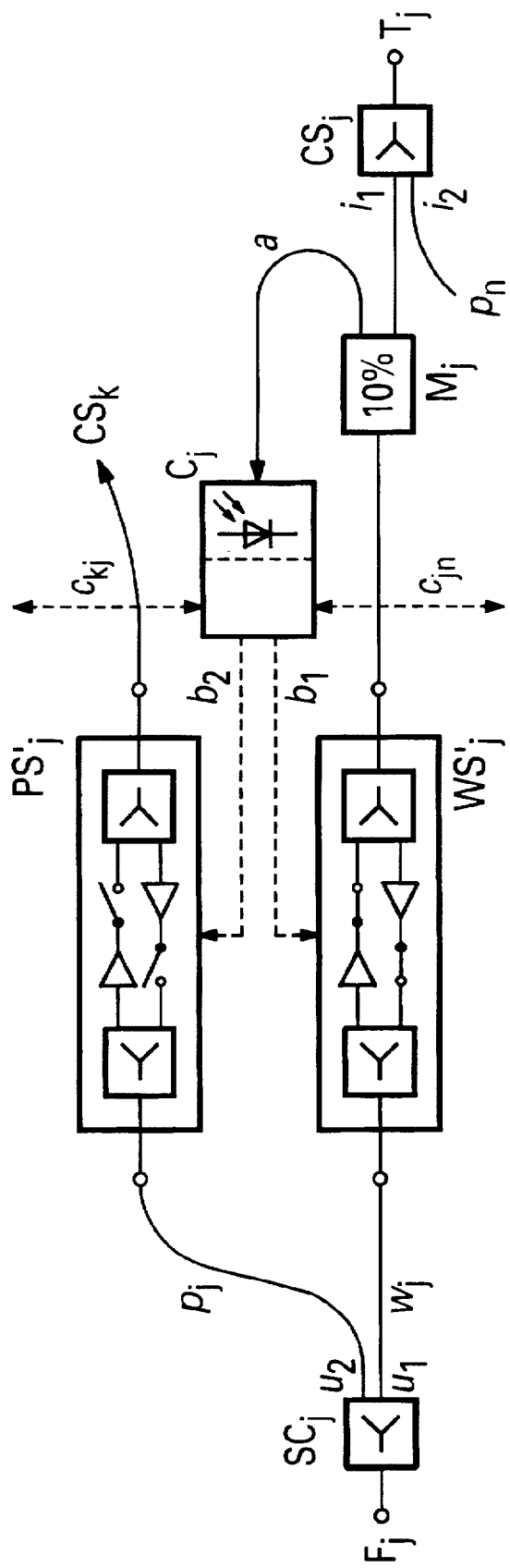

The invention will be further explained by means of a description of an exemplary embodiment, with reference being made to a drawing comprising the following figures:

FIG. 1 schematically shows a first embodiment of the optical-connection network having a protection configuration according to the invention;

FIG. 2 schematically shows a part of the protection configuration of a second embodiment of the optical-connection network according to the invention;

FIG. 3 schematically shows a part of the protection configuration for a bi-directional variant of the connection network according to FIG. 2.

E. DESCRIPTION OF EXEMPLARY EMBODIMENTS

According to a first exemplary embodiment, as schematically shown in FIG. 1, the optical-connection network comprises two subnetworks 1 and 2. The subnetwork 1 (2) comprises an access node 1.1 (2.1), a feed network 1.2 (2.2), and an access network 1.3 (2.3). The feed network 1.2 (2.2) in this example consists of an optical-fibre connection 1.5 (2.5) having a first end 1.6 (2.6) coupled to the access node 1.1 (2.1), and having a second end 1.7 (2.7) coupled to an access port 1.8 (2.8) of the access network 1.3 (2.3). In the fibre connection 1.5 (2.5), there may be included an optical amplifier (not shown). The access port 1.8 (2.8) of the access network 1.3 (2.3) is formed by a coupling member consisting of a splitting part 1.10 (2.10) and a switching part 1.11 (2.11). The access network 1.3 (2.3) is a tree-shapedly branched passive network for optical-fibre connections to a group G1 (G2) of network connections 1.12 (2.12). The group G1 (G2) comprises M subgroups G1.1, . . . , G1.M (G2.1, . . . , G2.M) of network connections 1.12 (2.12) to fibre connections of tree-shapedly branched passive network parts 1.13 (2.13), hereinafter called subtrees, of the access network 1.3 (2.3). Each subtree 1.13 (2.13) has its own access port, which is formed by a splitting member 1.14 (2.14) having a first input port 1.15 (2.15) and a second input port 1.16 (2.16), and having two or more output ports 1.17 (2.17) by which fibre connections 1.18 (2.18) are coupled to the network connections 1.12 (2.12) of a subgroup in question. The splitting part 1.10 (2.10) of the access port 1.8 (2.8) is a passive optical (1:2M) splitter having 2M outputs 1.19 (2.19). The switching part 1.11 (2.11) provides for two sets s1 and s2 each having M optical signal switches 1.20 (2.20), hereinafter called switches 1.20 (2.20) for short. Depending on the required signal strength at the location of the network connections 1.12 (2.12), said switches may be combined with amplifiers (not shown). The switches are included in the outputs 1.19 (2.19), one per output. A first set $u_1$ of M outputs 1.19 (2.19), in which the switches of the set s1 have already been included, is coupled, by way of optical-fibre connections 1.22 (2.22), to the first input ports 1.15 (2.15) of the M splitting members 1.14 (2.14). A second set $u_2$ of M outputs 1.19 (2.19), in which the switches of the set s2 are included, is coupled, by way of optical-fibre connections 1.23 (2.23) to the second input ports 1.16 (2.16) of the splitting members 2.14 (1.14) of the other subnetwork 2 (1).

In undisturbed operation, when the two subnetworks are fully operational, the switches 1.20 and 2.20 of the sets s1 in the switching parts 1.11 and 2.11 of the access ports 1.8 and 2.8 of both subnetworks 1 and 2 are in the closed position (position st1), while the switches of the sets s2 are in the open position (position st2). In the event of such positions of the switches, there is possible, between the access nodes 1.1 and 2.1 and both groups of network connections, optical signal traffic, which courses fully separately over both subnetworks. Upon failure of at least one of the signal connections between the access node 1.1 (2.1) and the first input port 1.15 (2.15) of one of the splitting members 1.14 (2.14) in the one subnetwork 1 (2), all switches 1.20 (2.20) of the first set s1 in question are set at the open position (position st2), and all switches 2.20 (1.20) of the second set s2 in the other subnetwork 2 (1) are set at the closed position (position st1). In doing so, the (closed) position of the switches 2.20 (1.20) of the first set s1 in the other subnetwork 2 (1) is not changed. In this case, the other subnetwork 2 (1) is in fact extended to a tree-shapedly branched passive optical network having an increased number of network connections, in this case the network connections of both groups G1 and G2. For its original group G2 (G1) of network connections 2.12 (1.12), the subnetwork 2 (1) therefore continues to be operational, while the group G1 (G2) of network connections becomes accessible by way of a protection path which was formed by switching over the switches 2.20 (1.20) of the second set s2 by way of the access node 2.1 (1.1), the optical-fibre connection 2.5 (1.5), the access port 2.8 (1.8), and the fibre connections 2.23 (1.23) to the second input ports 1.16 (2.16) of the access ports 1.14 (2.14) of the subtrees 1.13 (2.13).

To each of the access nodes 1.1 and 2.1 of the subnetworks 1 and 2, respectively, there is connected a main station HS1 and HS2, which transmits the signals to be transported over the subnetworks in the direction of the network connections. At a higher network level, the two main stations are coupled, possibly by way of other main stations, to make protection possible on the basis of the dual-homing principle. In the event of undisturbed operation of both subnetworks, the main station HS1 (HS2) in question provides the signal distribution for the subnetwork 1 (2) in question. Upon failure of any signal on, e.g., one of the fibre connections 1.22 between an output 1.19 of the access port 1.8 and the first input port 1.15 of the access port 1.14 of one of the subtrees 1.13, e.g., due to failure of any network component between the main station HS1 and one of the said first input ports 1.15, as a result of which at least the network connections of one of the subgroups G1.1, . . . . G1.M are no longer accessible to the signal distribution of the main station HS1, there is switched over to the protection path by way of the access node 2.1 and the access network 2.2 of the subnetwork 2. The sets in question of switches s1 and s2 in the access ports 1.8 and 2.8 may be such that the switching over may be done manually as soon as any signal failure is established. Preferably, however, to each access port 1.8 and 2.8 there are added monotoring and control means, which monitor the presence of signal traffic on every fibre connection 1.22 and 2.22 between the access ports 1.8 and 2.8 and the first input ports 1.15 and 2.15 of the access ports 1.14 and 2.14 and, upon detection of the failure of the signal traffic on any of the said connections 1.22 and 2.22, provide the switching over to the protection path in question (see below under the description of FIG. 2).

The two subnetworks 1 and 2 have a cross bridging by way of the fibre connections 1.23 and 2.23, but for the rest should preferably be fully separated geographically with a view to protection. At any rate, the various sets of switches and the associated control members in the access ports 1.8 and 2.8 should have separate power supplies.

Basically, the set s1 of switches in the access port 1.8 (2.8) may also be replaced by a single switch in the access network 1.2 (2.2) or in the access node 1.1 (2.1). The location of the set in the switching part 1.11 (2.11) of the access port 1.8 (2.8) may still offer an additional protection advantage. For this purpose, in a variant of the optical-connection network, the monitoring and control means are arranged in such a manner that, upon failure in a connection path between the access node and an access port 1.14 (2.14) of a subtree 1.13 (2.13), it may be distinguished whether the failure is, or is not, the result of a failure exclusively in one of the connection paths from the set s1 of switches by way of the fibre connections 1.22 (2.22) up to the access ports 1.14 (2.14). Upon the occurrence of such a failure, the switches of both sets s1 are set at the open position (position st2), and the switches of both sets s2 at the closed position (position st1). As a result, there is created a connection network in which, basically without capacity loss, the signal traffic intended for the group G1 (G2) of network connections of the one subnetwork 1 (2) may be led entirely by way of the access node 2.1 (1.1) and the access network 2.2 (1.2) of the other subnetwork 1 (2). The greater the geographical distance between the access ports 1.8 (2.8) and 1.14 (2.14), the greater the importance of said variant.

The main stations HS1 and HS2 may be distributive stations, such as for CATV [cable television]. In this case, the subnetworks are passive optical networks having unidirectional optical connections, as shown in FIG. 1. In the event that the main stations are telecommunication exchanges for providing bi-directional communication, such as telephony and various wide-band services, the optical connections in the subnetworks between the access nodes and the network connections should be bi-directional. For this purpose, there may be present, for each subnetwork, an identical overlay network having the corresponding switches and amplifiers orientated in opposite directions, which is of course a costly embodiment. The fibre connections of each subnetwork are preferably used bi-directionally, with the available switches and amplifiers having to be constructed bi-directionally (see below under the description of FIG. 3).

The principle of the protection configuration described with reference to FIG. 1 is also applicable to optical-connection networks comprising more than two subnetworks. Such an optical-connection network is described using FIG. 2. The figure shows a part of the protection configuration of an optical-connection network comprising $N \geq 2$ subnetworks. With a view to simplicity, for three subnetworks j, k and n (where $j \neq k$, $j \neq n$ and $1 \leq j,k,n \leq N$) the figure shows only optical terminals $F_j$, $F_k$, and $F_n$ for second ends (such as the second ends 1.7 and 2.7 in FIG. 1) of the feed networks of the subnetworks j, k and n, and optical terminals $T_j$, $T_k$ and $T_n$ for the terminals of the access networks (such as the subtrees 1.13 and 2.13 of FIG. 1) of the subnetworks j, k and n. The following, which is described for the j-th subnetwork, is applicable, mutatis mutandis, to the corresponding components of the k-th and the n-th subnetwork. The connection $F_j$ constitutes the input to an optical splitter $SC_j$, which is provided with two outputs $u_1$ and $u_2$. The connection $T_j$ constitutes the output of an optical combinator $CS_j$, which is provided with two inputs $i_1$ and $i_2$ (corresponding to the inputs 1.15 (2.15) and 1.16 (2.16) in FIG. 1). The output $u_1$ of the splitter $SC_j$ and the input $i_1$ of the combinator $CS_j$ are coupled by way of an operational optical connection $w_j$, in which there is included an optical switch $WS_j$. The output $u_2$ of the splitter $SC_j$ and the input $i_2$ of the combinator $CS_k$ of the subnetwork k are coupled by way of an optical protection connection $P_j$, in which there is included an optical switch $PS_j$. The switches $WS_j$ and $PS_j$ are, by way of (electrical) drive connections b1 and b2, separately switchable from a control member $C_j$. In the operational connection $w_j$ there is also included an uncoupling member $M_j$ which, by way of an uncoupling output a, supplies a part of the optical-signal power (e.g., 10%) in the operational connection $w_j$ to the control member $C_j$. The control members $C_j$ and $C_k$ of the subnetworks j and k, which are optically coupled by way of the protection connection $p_j$, are coupled by way of an electrical connection $c_{kj}$. Depending on the construction of the setup chosen for the control, said electrical connection may be constructed either as a direct connection between the consecutive control members, as drawn in the figure, or by way of a central control member.

The protection configuration of FIG. 2 operates as follows. In the event of undisturbed operation, the switches $WS_j$ are in a closed position, as drawn, and continue to be in said position for as long as each control member $C_j$, by way of the uncoupling member $M_j$, detects sufficient signal power in the operational connection $w_j$. If, in one of the subnetworks, e.g., the k-th subnetwork, the control member $C_k$ detects too little or no longer any signal power on the operational connection $w_k$ by way of the uncoupling member $M_k$, the switch $WS_k$ is set at the open position and, by way of the connection $c_{kj}$ and the control member $C_j$, the switch $PS_j$ in the corresponding protection connection $p_j$ is set at the closed position. In this manner, the group Gk of network connections is again accessible, this time over a protection path which is formed by closing the switch $PS_j$ by way of the feed network of the j-th subnetwork and the protection connection $p_j$ to the access port connected to the terminal $T_k$ of the access network of the k-th subnetwork. In said protection configuration, with each operational connection $w_k$ there is associated a protection connection $p_j$ ($1 \leq k \neq j \leq N$), so that the principle of dual homing for each group Gk continues to be fully applicable. In an embodiment of said protection configuration for $N=3$ subnetworks, the protection connection $P_k$ is coupled to the second input $i_2$ of the combinator $CS_n$, and the control members $C_k$ and $C_n$ are coupled by way of a connection $c_{nk}$. For $N=2$ subnetworks, the protection connection $p_k$ is coupled to the second input $i_2$ of the combinator $CS_j$, and the protection configuration is fully equivalent to that of the exemplary embodiment according to FIG. 1.

For the protection configuration according to FIG. 2, too, a variant is possible in which, in the event of a failure as a result of a failure established in one of the operational connections $w_j$, there is set up, by opening all switches $WS_j$ and closing all switches $PS_j$, a connection network in which all groups of network connections are again fully accessible, albeit all of them by way of the main station to which the group in question has been allocated for applying the principle of dual homing.

Should the number of subnetworks be three, four or more, it is possible to simply extend the described protection principle, if necessary, to a threefold, fourfold etc., accessibility. To that end there are chosen, for the optical splitters $SC_j$ and the optical combinators $CS_j$, splitters and combinators having three, four etc. outputs and inputs, respectively, and these are coupled to one another in a corresponding manner, apart from over an operational connection, also over two, three etc. protection connections, in such a manner that each splitter is coupled to the combinators of three, four etc. different subnetworks.

For a bi-directional optical-connection network in which the fibre connections are used bi-directionally, the protection configuration may basically continue to be the same. In the return-signal direction, the functions of the splitters $SC_j$ and the combinators $CS_j$ are inverted when using passive components, so that said components may continue to be unchanged. In this case, however, the optical switching means applied, whether combined with amplifiers or not, must be suitable for bi-directional operation. In FIG. 3, there is schematically shown a part of the protection configuration as depicted in FIG. 2, in which the optical switches $WS_j$ and $PS_j$ are replaced by bi-directional versions, namely, optical switches $WS'_j$ and $PS'_j$.

The described protection configurations are of particular advantage in tree-shapedly branched optical networks having large numbers of network connections, and therefore having a high degree of splitting. Therefore, the optical switches applied are preferably combined with optical amplifiers. As such a combination of an optical on/off signal switch and an optical amplifier, there may be applied, e.g., an erbium-doped fibre amplifier (EDFA). A bi-directional version of such an EDFA applied as switch is disclosed, e.g., in reference [5]. As integrated embodiment for such an optical switch/amplifier, there may be applied, e.g., a semiconductor laser amplifier (SCLA), as described in reference [6].

We claim:

1. An optical-connection network including first and second separately operating optical access systems having a protection configuration interconnecting the first and second separately operating optical access systems, the network comprising:

first and second access nodes;

first and second groups of optical network connections;

first and second access networks each including an access port and a passive optical network for respectively providing optical connections to the first and the second group of optical network connections;

first and second feed networks for respectively coupling the first and second access nodes to the access ports of the first and second access networks, the first and second feed networks respectively providing operational connections of the first and second access networks;

a first cross-coupling device which couples the access port of the second access network to the passive optical network of the first access network in such a way that the second feed network provides a protection connection for the first access network via the access port of the second access network to the passive optical network of the first access network for use upon failure of the operational connection of the first access network; and a first protection switch which switches the operational connection to the protection connection of the first access network upon failure of the operational connection of the first access network, wherein when the operational connection of the first access network fails, the second access node remains operatively coupled to the second group of optical network connections.

2. The optical-connection network according to claim 1 further comprising:

a second cross-coupling device which couples the access port of the first access network to the passive optical network of the second access network in such a way that the first feed network provides a protection connection for the second access network via the access port of the first access network to the passive optical network of the second access network for use upon failure of the operational connection of the second access network; and a second protection switch which switches the operational connection to the protection connection of the second access network upon failure of the operational connection of the second access network, wherein when the operational connection of the second access network fails, the first access node remains operatively coupled to the first group of optical network connections.

3. The optical-connection network according to claim 2, wherein the first protection switch comprises separate optical switching members for switching on a protection connection and for switching off its corresponding operational connection, respectively.

4. The optical-connection network according to claim 3, wherein at least one of the access networks comprises a plurality of tree-shaped branched connection parts, wherein each branched connection part has a separate access port, the first and second feed networks by way of optical splitting members being separately coupled to the separate access ports of the branched connection parts, and wherein the separate optical switching members in question comprise a plurality of optical switches corresponding to the number of connection parts, one in each separate coupling.

5. The optical-connection network according to claim 4, wherein at least one of the switches includes an on/off-switchable signal amplifier.

6. The optical-connection network according to claim 4, wherein the optical connections in the network are bi-directional connections, and wherein at least one of the optical switches includes a bi-directional on/off-switchable signal amplifier.

7. An optical-connection network including a plurality of separately operating optical access systems having a protection configuration interconnecting the plurality of separately operating optical access systems, the network comprising:

a plurality (N) of access nodes;

a plurality (N) of groups of optical network connections;

a plurality of separate subnetworks, with a j-th subnetwork (for each j=1 to N) including an optical access port and a passive optical network for providing optical connections between the optical access port and a j-th group of optical network connections;

a plurality of feed networks, with a j-th feed network (for each j=1 to N) for coupling a j-th access node to the access port of the j-th subnetwork, each j-th feed network providing an operational connection of the j-th subnetwork;

a cross-coupling device which couples an n-th feed network (n=1 to N and n≠j) to the access port of the j-th subnetwork, in such a way that the n-th feed network provides a protection connection of the j-th subnetwork for use upon failure of the operational connection of the j-th subnetwork; and a protection switch which switches over the operational connection of the j-th subnetwork to the protection connection of the j-th subnetwork by way of the n-th feed network upon failure of the operational connection of the j-th subnetwork, wherein when the operational connection of an j-th subnetwork fails, the n-th access node corresponding to the n-th feed network remains operatively coupled to the n-th group of optical network connections.

8. The optical-connection network according to claim 7, wherein the protection switch of each j-th subnetwork (for j=1 to N) comprises:

a first optical switching member included in the coupling of the j-th feed network to the access port of the j-th subnetwork, for switching the operational connection of the j-th subnetwork on/off;

a second optical switching member included in the coupling of the j-th feed network to the access port of a k-th subnetwork (k=1 to N and k≠j), for switching the protection connection for the k-th subnetwork on/off; and a control member for separately controlling the first and second optical switching members;

wherein the control member contained within the protection switch of the j-th subnetwork is coupled to the control member contained within the protection switch of the k-th subnetwork, and wherein for using the protection connection of the k-th subnetwork by way of the feed network of the j-th subnetwork, the second optical switching member of the j-th subnetwork is on, and the first optical switching member of the k-th subnetwork is off.

9. The optical-connection network according to claim 8, wherein at least the access network of the k-th subnetwork comprises at least one tree-shaped branched connection part, each connection part being provided with a separate access port, with the feed networks of the j-th and k-th subnetworks having, by way of optical splitting members, separate couplings to the separate access ports of the connection parts, and with the switching members in question including a number of optical switches corresponding to the number of connection parts, one in each separate coupling.

10. The optical-connection network according to claim 8, wherein at least one of the optical switching members includes an on/off-switchable optical signal amplifier.

11. The optical-connection network according to claim 8, wherein the optical connections in the network are bi-directional connections, and wherein at least one of the optical switching members includes a bi-directional on/off-switchable optical signal amplifier.

* * * * *